United States Patent
Uematsu et al.

(10) Patent No.: US 11,747,564 B2
(45) Date of Patent: Sep. 5, 2023

(54) MANUFACTURING METHOD AND MANUFACTURING APPARATUS OF OPTICAL SPLITTERS

(71) Applicant: NIPPON TELEGRAPH AND TELEPHONE CORPORATION, Tokyo (JP)

(72) Inventors: Takui Uematsu, Musashino (JP); Hidenobu Hirota, Musashino (JP); Hiroyuki Iida, Musashino (JP); Takashi Ebine, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/762,252

(22) PCT Filed: Oct. 2, 2019

(86) PCT No.: PCT/JP2019/038989
§ 371 (c)(1),
(2) Date: Mar. 21, 2022

(87) PCT Pub. No.: WO2021/064916
PCT Pub. Date: Apr. 8, 2021

(65) Prior Publication Data
US 2022/0342153 A1    Oct. 27, 2022

(51) Int. Cl.
*G02B 6/28* (2006.01)
(52) U.S. Cl.
CPC .................. *G02B 6/2826* (2013.01)
(58) Field of Classification Search
CPC .................................. G02B 6/2826
(Continued)

(56) References Cited

U.S. PATENT DOCUMENTS

| 4,588,255 A | 5/1986 | Tur et al. |
| 4,768,850 A | 9/1988 | Moslehi et al. |

(Continued)

FOREIGN PATENT DOCUMENTS

| JP | S5990816 A | 5/1984 |
| JP | 201540916 A | 3/2015 |

OTHER PUBLICATIONS

R. A. Bergh et al., "Single-mode fibre optic directional coupler", Electronics Letters, Mar. 27, 1980, vol. 16, No. 7.

*Primary Examiner* — Sung H Pak
(74) *Attorney, Agent, or Firm* — Harness, Dickey & Pierce, P.L.C.

(57) ABSTRACT

A manufacturing method of an optical splitter of the present disclosure includes: performing first processing that involves mounting a coated optical fiber on a jig configured to store the coated optical fiber, and polishing the coated optical fiber together with the jig until reaching a vicinity of a core of the coated optical fiber or the core of the coated optical fiber; performing second processing that involves applying a refractive index matching material having a refractive index lower than a refractive index of the core of the coated optical fiber onto a polished face of the coated optical fiber on the jig polished in the first processing or onto a polished face of an optical waveguide circuit having been polished in advance until reaching a vicinity of a core or reaching the core, and then bonding the polished faces to each other; and performing third processing that involves positionally aligning the polished faces bonded with each other in the second processing to move the jig or the optical waveguide circuit to a position at which a desired splitting ratio is obtained.

14 Claims, 6 Drawing Sheets

(58) Field of Classification Search
USPC .......................................................... 385/27
See application file for complete search history.

(56) References Cited

U.S. PATENT DOCUMENTS

| 5,533,155 | A | * | 7/1996 | Barberio | ............. | G02B 6/2826 |
|---|---|---|---|---|---|---|
| | | | | | | 385/30 |
| 6,535,685 | B1 | | 3/2003 | Tullis | | |
| 6,968,103 | B1 | | 11/2005 | Schroll et al. | | |
| 2005/0018970 | A1 | | 1/2005 | Tseng et al. | | |

* cited by examiner

MANUFACTURING METHOD AND MANUFACTURING APPARATUS OF OPTICAL SPLITTERS

CROSS-REFERENCE TO RELATED APPLICATIONS

This application is a 371 U.S. National Phase of International Application No. PCT/JP2019/038989, filed on Oct. 2, 2019. The entire disclosures of the above applications are incorporated herein by reference.

TECHNICAL FIELD

The present disclosure relates to a manufacturing method of an optical splitter for a coated optical fiber and a manufacturing apparatus of an optical splitter therefor.

BACKGROUND ART

An optical fiber local-light coupling technique has been studied as one of the optical splitting techniques in which an optical signal is input and output to and from a coated optical fiber without cutting the coated optical fiber. In the optical fiber local-light coupling technique, a coated optical fiber having been installed (a currently used optical fiber) is bent, another coated optical fiber (probe) is set to face the bent portion from a side face thereof, an optical signal is made to enter the bent portion from a tip end of the probe, and an optical signal that is output from the currently used optical fiber is received by the tip end of the probe (for example, see Patent Literature (PTL) 1).

In the optical fiber local-light coupling technique, by adjusting the degree of bending and setting the bending loss to be low, it is possible to split the light without interrupting the communication service of the currently used optical fiber. Because of this, the optical fiber local-light coupling technique may be applied in various uses, such as temporary optical splitting of the currently used optical fiber, monitoring of communication signals, uninterrupted switching operation by temporary line-duplexing and the like.

The optical fiber local-light coupling technique described above has the following problems. For example, long-term installation may reduce reliability due to damage to the currently used optical fiber by being bent. In addition, since it is difficult to change the bending shape, it is difficult to freely change the rate of light capable of being splitted of the light propagating in the currently used optical fiber. Furthermore, the input/output efficiency is fundamentally limited to approximately −15 dB (3% splitting ratio).

As another optical splitting technique, a optical splitting method has been studied in which two coated optical fibers with side faces thereof polished are brought into close proximity to each other and subjected to evanescent coupling (for example, see Non Patent Literature (NPL) 1).

CITATION LIST

Patent Literature

PTL 1: JP 2015-040916 A

Non Patent Literature

NPL 1: R. A. Bergh, et al., "Single-mode fibre optic directional coupler", Electronics Letters 27 Mar. 1980, vol. 16, no. 7.

SUMMARY OF THE INVENTION

Technical Problem

However, in NPL 1, a technique for manufacturing an optical splitter able to flexibly set a splitting ratio of the optical splitter while suppressing the loss of communication light that propagates within a currently used coated optical fiber to be low in such a manner as not to affect the communication service, is not considered.

Means for Solving the Problem

In order to solve the problems described above, an object of the present disclosure is to provide a manufacturing method of an optical splitter and a manufacturing apparatus of the optical splitter able to freely set a splitting ratio of the optical splitter while minimizing an impact on communication light that propagates within a currently used coated optical fiber.

To minimize the impact on the communication light, a refractive index matching material having a refractive index lower than that of a core of the currently used coated optical fiber is applied onto a polished face. In order to freely set the splitting ratio of the optical splitter, the polished faces are positionally aligned with each other while the splitting ratio being monitored, and are moved to a position at which a desired splitting ratio is obtained.

Specifically, a manufacturing method of an optical splitter of the present disclosure includes: performing first processing that involves mounting a coated optical fiber on a jig configured to store the coated optical fiber, and polishing the coated optical fiber together with the jig until reaching a vicinity of a core of the coated optical fiber or the core of the coated optical fiber; performing second processing that involves applying a refractive index matching material having a refractive index lower than a refractive index of the core of the coated optical fiber onto a polished face of the coated optical fiber on the jig polished in the first processing or onto a polished face of an optical waveguide circuit having been polished in advance until reaching the vicinity of a core or reaching the core, and then bonding the polished faces to each other; and performing third processing that involves positionally aligning the polished faces bonded with each other in the performing second processing to move the jig or the optical waveguide circuit to a position at which a desired splitting ratio is obtained.

Specifically, a manufacturing apparatus of an optical splitter of the present disclosure includes: a polishing unit configured to polish a coated optical fiber together with a jig on which the coated optical fiber is mounted until reaching a vicinity of a core of the coated optical fiber or the core of the coated optical fiber; a bonding unit configured to apply a refractive index matching material having a refractive index lower than a refractive index of the core of the coated optical fiber onto a polished face of the coated optical fiber on the jig polished by the polishing unit or onto a polished face of an optical waveguide circuit having been polished in advance until reaching the vicinity of a core or reaching the core, and to bond the polished faces to each other; and an adjustment unit configured to positionally align the bonded polished faces with each other by the bonding unit to move the jig or the optical waveguide circuit to a position at which a desired splitting ratio is obtained.

Effects of the Invention

According to the manufacturing method of an optical splitter or the manufacturing apparatus of the optical splitter of the present disclosure, the splitting ratio of the optical splitter may be freely set while minimizing an impact on the communication light.

DESCRIPTION OF EMBODIMENTS

Hereinafter, embodiments of the present disclosure will be described in detail with reference to the drawings. Note that the present disclosure is not limited to the embodiments described below. These embodiments are just illustrative examples, and the present disclosure can be implemented in forms in which various modifications and improvements are added on the basis of knowledge of those skilled in the art. Note that constituent elements with the same reference signs in the specification and the drawings are assumed to be the same constituent elements.

Figure 1:
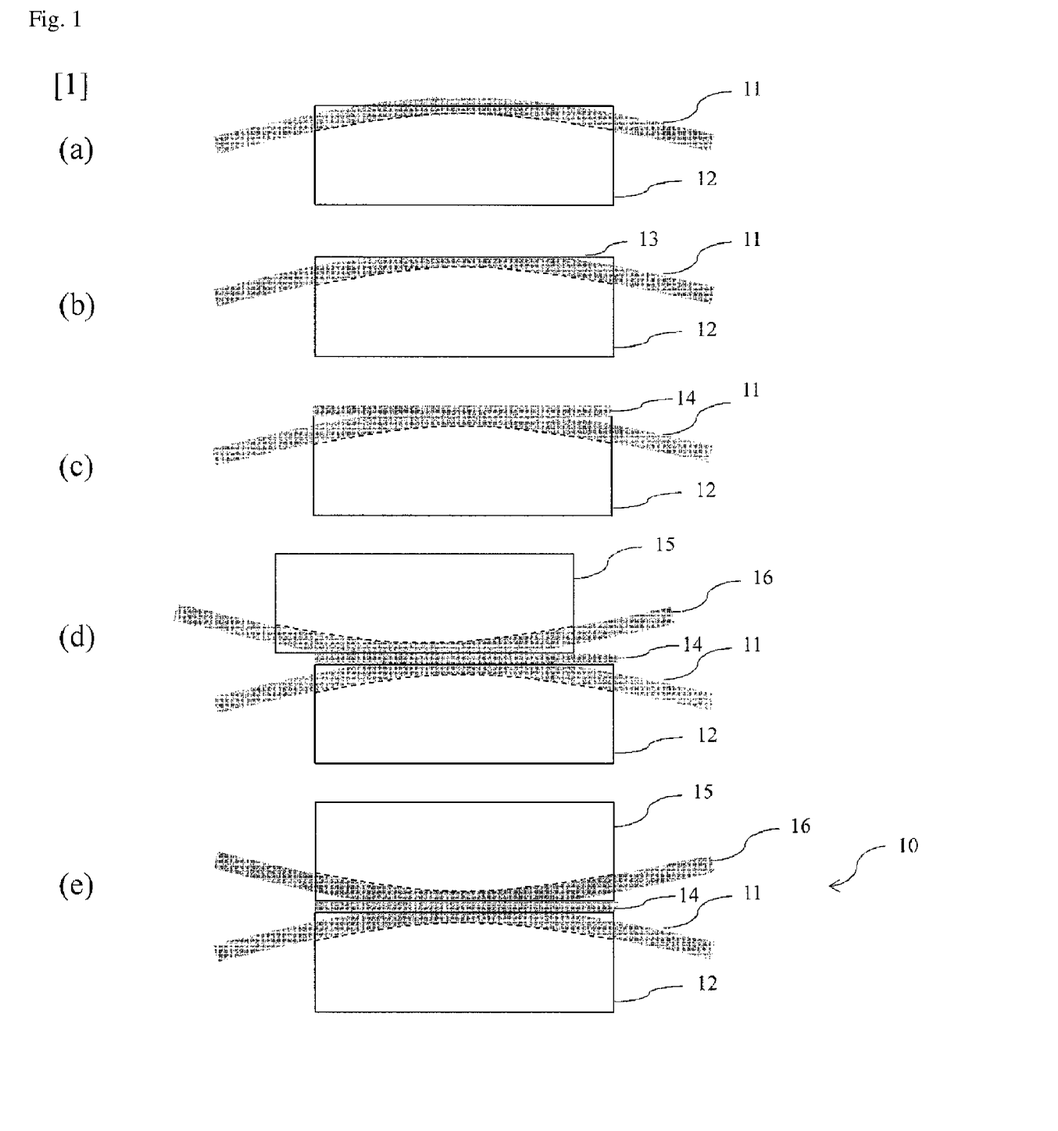
FIG. 1 illustrates a manufacturing method of an optical splitter.

A manufacturing method of an optical splitter of the present disclosure will be described with reference to FIG. 1. In FIG. 1, 10 refers to an optical splitter, 11 refers to a coated optical fiber, 12 refers to a jig, 13 refers to a polished face, 14 refers to a refractive index matching material, 15 refers to an optical waveguide circuit, and 16 refers to an optical waveguide.

A manufacturing method of an optical splitter of the present disclosure includes: performing first processing that involves mounting a coated optical fiber 11 on a jig 12 configured to store the coated optical fiber 11, and polishing the coated optical fiber 11 together with the jig 12 until reaching a vicinity of a core of the coated optical fiber 11 or the core of the coated optical fiber 11; performing second processing that involves applying a refractive index matching material 14 having a refractive index lower than a refractive index of the core of the coated optical fiber 11 onto a polished face of the coated optical fiber 11 on the jig polished in the first processing or onto a polished face of an optical waveguide circuit 15 having been polished in advance until reaching a vicinity of a core or reaching the core, and then bonding the polished faces to each other; and performing third processing that involves positionally aligning the polished faces bonded with each other in the second processing to move the jig 12 or the optical waveguide circuit 15 to a position at which a desired splitting ratio is obtained.

A manufacturing apparatus of an optical splitter of the present disclosure includes: a polishing unit (not illustrated) configured to polish a coated optical fiber 11 together with a jig 12 on which the coated optical fiber 11 is mounted until reaching a vicinity of a core of the coated optical fiber 11 or the core of the coated optical fiber 11; a bonding unit (not illustrated) configured to apply a refractive index matching material 14 having a refractive index lower than a refractive index of the core of the coated optical fiber 11 onto the polished face of the coated optical fiber 11 on the jig polished by the polishing unit or onto a polished face of an optical waveguide circuit 15 having been polished in advance until reaching a vicinity of a core or reaching the core, and to bond the polished faces to each other; and an adjustment unit (not illustrated) configured to positionally align the polished faces bonded with each other by the bonding unit to move the jig 12 or the optical waveguide circuit 15 to a position at which a desired splitting ratio is obtained.

The coated optical fiber 11 is mounted on and fixed to the jig 12 configured to store the coated optical fiber 11 ((a) of FIG. 1). An adhesive or the like may be used for fixing the coated optical fiber 11. After being fixed with the adhesive or the like, the coated optical fiber 11 is polished together with the jig until reaching the vicinity of the core of the coated optical fiber 11 or the core of the coated optical fiber 11 ((b) of FIG. 1). Steps illustrated in (a) of FIG. 1 and (b) of FIG. 1 constitute the first step. The first step may be performed by the polishing unit (not illustrated).

The refractive index matching material 14 is applied onto the polished face 13 of the jig 12 having been polished in the first step ((c) of FIG. 1). The refractive index matching material 14 has a refractive index that is lower than that of the core of the coated optical fiber 11. The optical waveguide circuit 15 polished until reaching the vicinity of a core or reaching the core is prepared in advance. The optical waveguide circuit 15 may be a jig manufactured in the first step, where an optical fiber is polished. In this case, the optical waveguide 16 is a coated optical fiber, and is polished until reaching a core of the coated optical fiber or reaching the core. The optical waveguide circuit 15 may be a planar lightwave circuit (PLC). In this case, the optical waveguide 16 serves as the core. The polished face 13 of the jig 12 and the polished face of the optical waveguide circuit 15 are bonded with the refractive index matching material 14 interposed therebetween ((d) of FIG. 1). In (c) of FIG. 1, the refractive index matching material 14 is applied onto the polished face 13 of the jig 12, but the refractive index matching material 14 may be applied onto the polished face of the optical waveguide circuit 15, or may be applied onto both of the polished faces. Steps illustrated in (c) of FIG. 1 and (d) of FIG. 1 constitute the second step. The second step may be performed by the bonding unit (not illustrated).

The polished faces having been bonded in the second step are positionally aligned with each other to move the jig 12 or the optical waveguide circuit 15 to a position at which the desired splitting ratio is obtained for the optical waveguide 16 or the coated optical fiber 11 while light that is output from the optical waveguide 16 or the coated optical fiber 11 being monitored ((e) of FIG. 1). A step illustrated in (e) of FIG. 1 constitutes the third step. The third step may be performed by the adjustment unit (not illustrated).

Figure 2:
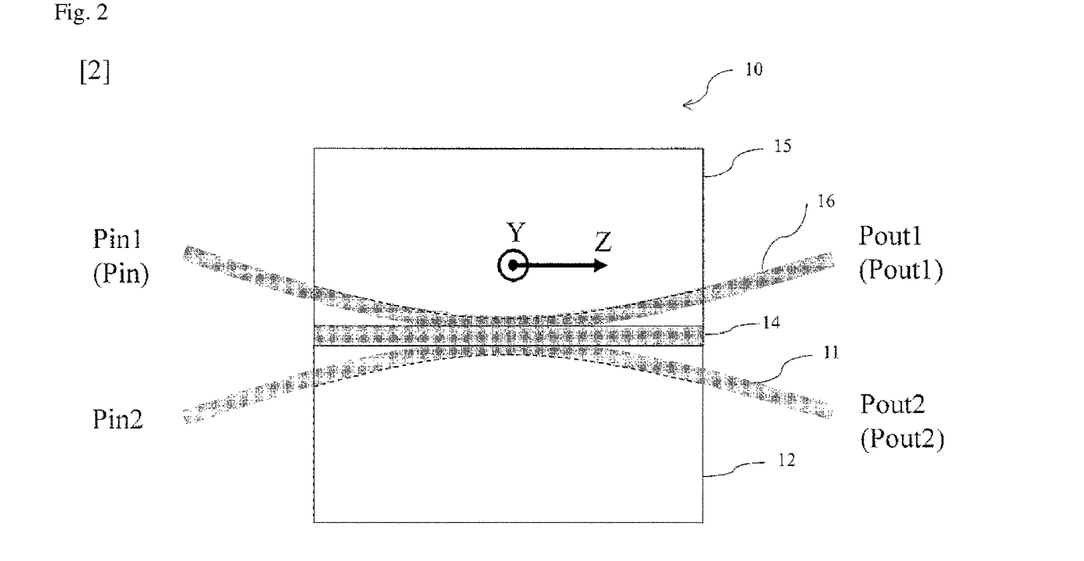
FIG. 2 illustrates a configuration of an optical splitter.

The configuration of the manufactured optical splitter is illustrated in FIG. 2. In FIG. 2, 10 refers to the optical splitter, 11 refers to the coated optical fiber, 12 refers to the jig, 14 refers to the refractive index matching material, 15 refers to the optical waveguide circuit, and 16 refers to the optical waveguide. In FIG. 2, the name of each port of the optical splitter 10 and input or output light intensity at that port (in parentheses) are represented as follows: the input side of the optical waveguide 16 is Pin 1 (Pin), the input side of the coated optical fiber 11 is Pin 2, the output side of the optical waveguide 16 is Pout 1 (Pout 1), and the output side of the coated optical fiber 11 is Pout 2 (Pout 2).

In FIG. 2, a direction horizontal relative to the polished face on which the refractive index matching material 14 is applied and perpendicular to the coated optical fiber 11 is defined as a Y-axis, and a direction that is horizontal relative to the polished face on which the refractive index matching material 14 is applied and is also a longitudinal direction of the coated optical fiber 11 is defined as a Z-axis.

Figure 3:
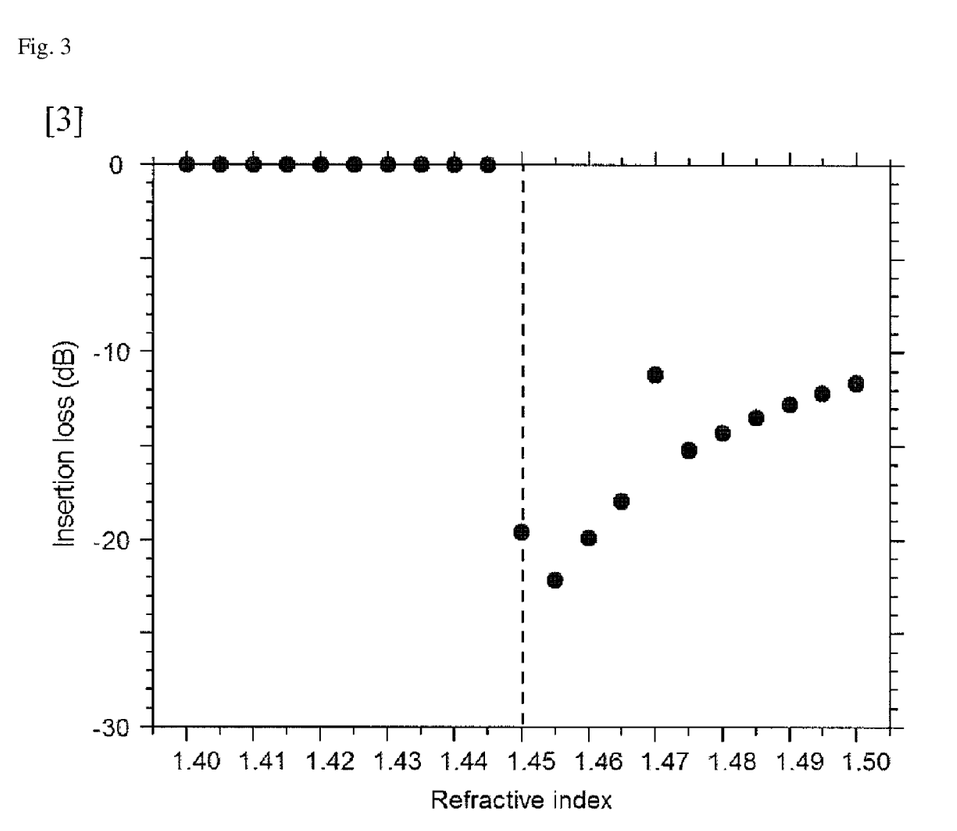
FIG. 3 illustrates insertion loss with respect to a refractive index of a refractive index matching material.

Insertion loss from port Pin 2 to port Pout 2 with respect to the refractive index of the refractive index matching material is illustrated in FIG. 3. In FIG. 3, the refractive index of the refractive index matching material is indicated on the horizontal axis, and the insertion loss from port Pin 2 to port Pout 2 illustrated in FIG. 2 is indicated on the vertical axis. The refractive index of the core of the coated optical fiber 11 is 1.45, as indicated by a dashed line. From FIG. 3, it is understood that, when the refractive index of the refractive index matching material is smaller than the refractive index 1.45 of the core of the coated optical fiber 11, the insertion loss may be zero. Because of this, in the optical splitter 10 of the present disclosure, the refractive index of the refractive index matching material is set to be smaller than the refractive index 1.45 of the core of the coated optical fiber 11. Such a setting makes it possible to minimize an impact on communication light even when the communication light propagates within the coated optical fiber 11.

Figure 4:
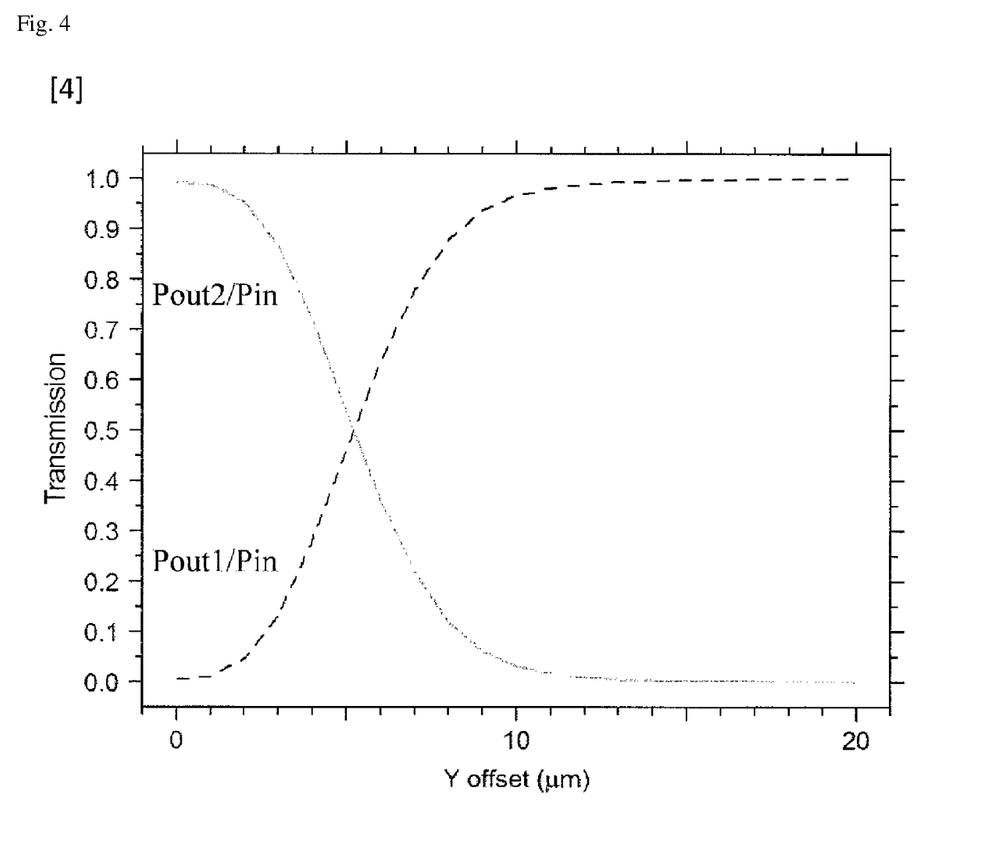
FIG. 4 illustrates a propagation ratio with respect to an offset in a Y-axis direction.

FIG. 4 illustrates a propagation ratio (light intensity ratio) Pout 2/Pin from port Pin 1 to port Pout 2 and a propagation ratio (light intensity ratio) Pout 1/Pin from port Pin 1 to port Pout 1, with respect to an offset in the Y-axis direction in FIG. 2. In FIG. 4, the offset in the Z-axis direction in FIG. 2 is considered to be zero.

Figure 5:
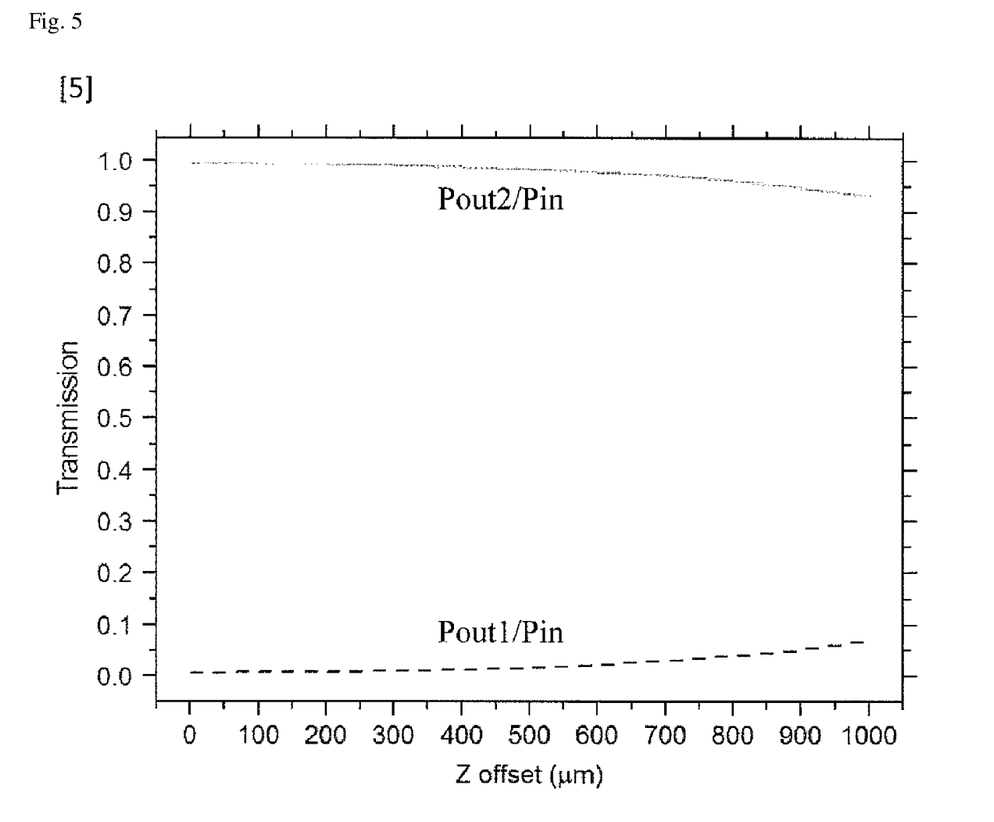
FIG. 5 illustrates a propagation ratio with respect to an offset in a Z-axis direction.

FIG. 5 illustrates a propagation ratio (light intensity ratio) Pout 2/Pin from port Pin 1 to port Pout 2 and a propagation ratio (light intensity ratio) Pout 1/Pin from port Pin 1 to port Pout 1, with respect to an offset in the Z-axis direction in FIG. 2. In FIG. 5, the offset in the Y-axis direction in FIG. 2 is considered to be zero.

As is understood from FIG. 4 and FIG. 5, when the polished faces are positionally aligned with each other and moved to a position where a desired propagation ratio is obtained while monitoring the propagation ratio from port Pin 1 to port Pout 2 or port Pout 1, the splitting ratio of the optical splitter 10 may be freely set.

When performing the second step described above, the polished faces are bonded to each other in such a manner that the position of the center axis of the core of the coated optical fiber 11 and the position of the center axis of the core of the optical waveguide circuit 15 are spaced apart by a distance longer than or equal to a predetermined value. For example, in FIG. 4, when an offset in the Y-axis direction is 10 μm or more, the propagation ratio Pout 2/Pin takes a value close to zero. When the propagation ratio Pout 2/Pin is close to zero, test light that is input from the port Pin will not split into the port Pout 2. Accordingly, even when the coated optical fiber is used for the currently used communication, a situation in which the input of the test light gives an impact on the currently used communication may be minimized. The fact that the propagation ratio Pout 2/Pin is close to zero means that the loss of the currently used communication light which propagates from port Pin 2 to port Pout 2 also takes a value close to zero. Accordingly, even when the coated optical fiber 11 is used for the currently used communication, an influence on the currently used communication by the insertion of the optical splitter 10 may be minimized Note that in FIG. 5, even when an offset in the Z-axis direction is 1000 μm, since the propagation ratio Pout 2/Pin does not decrease, the impact on the currently used communication may be minimized when an offset amount sufficiently greater than 1000 μm is secured.

In addition, by setting the light intensity Pin of the test light input to port Pin 1 to be sufficiently low, the impact on the currently used communication may be further reduced. For example, the light intensity Pin is substantially set to a value of minimum light receiving sensitivity of a light receiving element configured to receive the test light at the port Pout 1. As a specific example, the light intensity may be set to a value of the minimum light receiving sensitivity +10 dB.

When polishing the coated optical fiber 11 together with the jig 12 and when polishing the optical waveguide circuit 15, cladding remains when polishing is performed until reaching the vicinity of the core in each case. The core is exposed with no cladding left when polishing is performed until reaching the core in each case. In a case where one or both cladding is to be left, the sum of the thickness of one or both cladding and the thickness of the refractive index matching material 14 is adjusted in such a manner that a predetermined amount of light propagating through the core of the coated optical fiber 11 is evanescent-coupled to split into the core of the optical waveguide 16. In a case where neither of the cladding is left to expose the core, the thickness of the refractive index matching material 14 is adjusted in such a manner that a predetermined amount of light propagating through the core of the coated optical fiber 11 is evanescent-coupled to split into the core of the optical waveguide 16.

In the third step, the jig 12 or the optical waveguide circuit 15 is moved to a position where, of the light propagating through the core of the coated optical fiber 11, the light that is evanescent-coupled to the core of the optical waveguide circuit 15 and splits into the core thereof takes a desired value of light intensity, and thereafter the polished faces are fixed to each other.

In FIG. 2, when light with light intensity Pin is input from port Pin 1 and light with light intensity Pout 2 is output from port Pout 2, a splitting ratio X is represented by an expression of X=Pout 2/Pin. This splitting ratio X may be represented by an expression of X=1−Pout 1/Pin, when light with light intensity Pin is input from port Pin 1 and light with light intensity Pout 1 is output from port Pout 1.

In the third step, it is desirable to move the jig 12 or the optical waveguide circuit 15 to a position where the splitting ratio X takes a desired value. The desired splitting ratio X may be achieved without measuring the light intensity of the light output from port Pout 2.

FIG. 4 illustrates a change in propagation ratio as the jig 12 or the optical waveguide circuit 15 is moved in the Y-axis direction in FIG. 2. FIG. 5 illustrates a change in propagation ratio as the jig 12 or the optical waveguide circuit 15 is moved in the Z-axis direction in FIG. 2. In FIG. 5, even when the offset becomes large in the Z-axis direction, the propagation ratio does not change significantly. For example, even when the jig 12 or the optical waveguide circuit 15 is moved from the offset 0 to 1000 μm in the Z-axis direction, the ratio Pout 2/Pin of the light intensity changes in a range substantially from 1 to 0.9. However, in FIG. 4, the propagation ratio changes significantly even when a small offset is set in the Y-axis direction. For example, when the jig 12 or the optical waveguide circuit 15 is moved from the offset 0 to 10 μm in the Y-axis direction, the ratio Pout 2/Pin of the light intensity changes from 1 to 0.

Thus, in the third step, the jig 12 or the optical waveguide circuit 15 is moved first in the Y-axis direction, that is, in a direction horizontal relative to the polished face 13 and perpendicular to the coated optical fiber 11, and when the splitting ratio X reaches the desired value, the movement is terminated to fix the jig 12 and the optical waveguide circuit 15 in such a manner that a relative positional relationship between the polished faces each other does not change. In a case where the splitting ratio X does not reach the desired value, the jig 12 or the optical waveguide circuit 15 is further moved in the Z-axis direction, that is, in a direction that is horizontal relative to the polished face 13 and is also a longitudinal direction of the coated optical fiber 11, and when the splitting ratio X reaches the desired value, the movement is terminated to fix the jig 12 and the optical waveguide circuit 15 in such a manner that the relative positional relationship between the polished faces does not change.

In a case where it is difficult to achieve the adjustment in which the splitting ratio X precisely takes the desired value only by moving the jig 12 or the optical waveguide circuit 15 in the Y-axis direction, rough adjustment may be performed in which the jig 12 or the optical waveguide circuit 15 is moved in the Y axis direction, and thereafter the jig 12 or the optical waveguide circuit 15 may be moved in the Z-axis direction to make the splitting ratio X take the desired value by fine adjustment.

In order to fix the jig 12 and the optical waveguide circuit 15, the refractive index matching material 14 may have an ultraviolet curing function, and may be irradiated with ultraviolet light when the splitting ratio X reaches the desired value. When an ultraviolet curing resin is used as the refractive index matching material, the jig 12 or the optical waveguide circuit 15 is preferably transparent with respect to ultraviolet light. To fix the jig 12 and the optical waveguide circuit 15, a fixing clip, a clamp, or the like may be used for preventing the jig 12 and the optical waveguide circuit 15 from moving mechanically.

Figure 6:
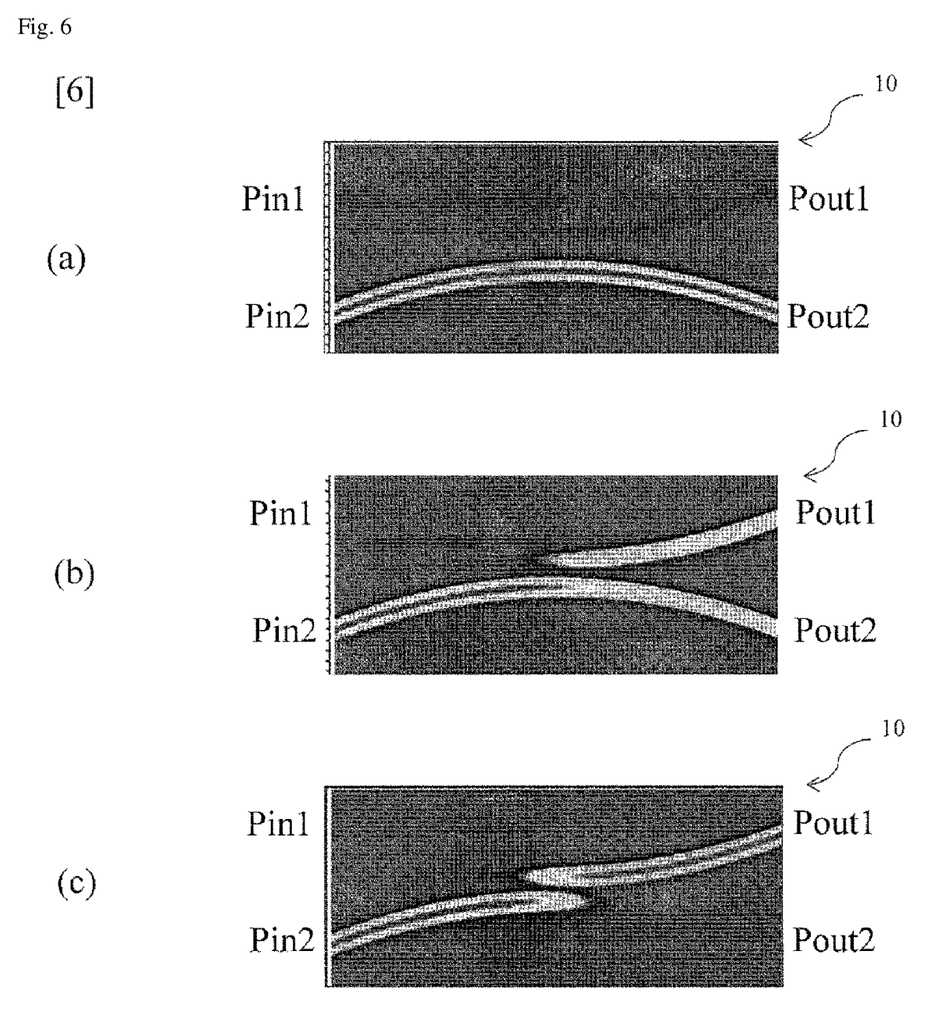
FIG. 6 illustrates electromagnetic field distribution of an optical splitter obtained by simulation.

Electromagnetic field distribution of the optical splitter 10 obtained by simulation using a three-dimensional beam propagation method is illustrated in FIG. 6. FIG. 6 corresponds to a case in which currently used communication light propagates from port Pin 2 to port Pout 1 or Pout 2. Note that (a) of FIG. 6, (b) of FIG. 6, and (c) of FIG. 6 correspond to situations in which the Y offset in FIG. 4 is set to 8 μm, 5 μm, and 0 μm, respectively. The splitting ratios from port Pin 2 to port Pout 1 resulted in 0.1, 0.5, and 1.0, respectively, from the simulation results. The electromagnetic field distribution in FIG. 6 represents well the above results. From FIG. 6, it is understood that the optical splitter 10 is able to obtain a desired splitting ratio by adjusting the Y offset.

INDUSTRIAL APPLICABILITY

The present disclosure can be applied in the information communication industry.

REFERENCE SIGNS LIST

10 Optical splitter
11 Coated optical fiber
12 Jig
13 Polished face
14 Refractive index matching material
15 Optical waveguide circuit
16 Optical waveguide

The invention claimed is:

1. A manufacturing method of an optical splitter, the method comprising:

performing first processing that involves mounting a coated optical fiber on a jig configured to store the coated optical fiber, and polishing the coated optical fiber together with the jig until reaching a vicinity of a core of the coated optical fiber or the core of the coated optical fiber;

performing second processing that involves applying a refractive index matching material having a refractive index smaller than 1.45 onto a polished face of the coated optical fiber on the jig polished in the first processing or onto a polished face of a planar lightwave circuit having been polished in advance until reaching a vicinity of a core or reaching the core, and then bonding the polished faces to each other; and performing third processing that involves positionally aligning the polished faces bonded with each other in the second processing to fix the polished faces to each other to a position at which a desired splitting ratio is obtained, wherein, in the third processing, a light receiving element is connected to one end of the core of the planar lightwave circuit, test light of a light intensity corresponding to a minimum light receiving sensitivity of the light receiving element is input to the other end of the core of the planar lightwave circuit, and a light intensity of the test light obtained by the light receiving element is measured and a splitting ratio is acquired in the polished faces to positionally align the polished faces at a position where the splitting ratio of a desired ratio is obtained.

2. The manufacturing method of the optical splitter according to claim 1, wherein, in the applying of the refractive index matching material and the bonding of the polished faces, the polished faces are bonded to each other in such a manner that a position of a center axis of the core of the coated optical fiber and a position of a center axis of the core of the planar lightwave circuit are spaced apart by a distance longer than or equal to a predetermined value.

3. The manufacturing method of the optical splitter according to claim 1, wherein, in the positionally aligning of the polished faces bonded to each other, the jig or the planar lightwave circuit is moved to a position where, of light propagating through the core of the coated optical fiber, light that is evanescent-coupled to the core of the planar lightwave circuit and splits from the core of the planar lightwave circuit takes a desired value of light intensity, and then the polished faces are fixed to each other.

4. The manufacturing method of the optical splitter according to claim 1, wherein, in the positionally aligning of the polished faces bonded to each other, light with light intensity Pin is input to one port of the planar lightwave circuit, from light intensity Pout of light that is output from the other port of the planar lightwave circuit and that is caused by the light with the light intensity Pin, a splitting ratio X of an optical splitter represented by an expression of X=1−Pout/Pin is calculated, and the jig or the planar lightwave circuit is moved to a position at which the splitting ratio takes a desired value.

5. The manufacturing method of the optical splitter according to claim 4, wherein the jig or the planar lightwave circuit is moved in a direction horizontal relative to the polished face and perpendicular to the coated optical fiber, and in a case that the splitting ratio takes the desired value, the movement is terminated and then the jig or the planar lightwave circuit is fixed, and in a case that the splitting ratio does not reach the desired value, the jig or the planar lightwave circuit is moved in a direction that is horizontal relative to the polished face and that is also a longitudinal direction of the coated optical fiber until the splitting ratio takes the desired value, and then the jig or the planar lightwave circuit is fixed.

6. A manufacturing apparatus of an optical splitter, the manufacturing apparatus comprising:

a polishing unit configured to polish a coated optical fiber together with a jig on which the coated optical fiber is mounted until reaching a vicinity of a core of the coated optical fiber or the core of the coated optical fiber;

a bonding unit configured to apply a refractive index matching material having a refractive index smaller than 1.45 onto a polished face of the coated optical fiber on the jig polished by the polishing unit or onto a polished face of an planar lightwave circuit having been polished in advance until reaching a vicinity of a core or reaching the core, and to bond the polished faces to each other;

an adjustment unit configured to positionally align the polished faces bonded with each other by the bonding unit to move the jig or the planar lightwave circuit to fix the polished faces to each other to a position at which a desired splitting ratio is obtained, and a light receiving element is connected to one end of the core of the planar lightwave circuit, wherein the light receiving element is configured to measure test light input at the other end of the core of the planar lightwave circuit and acquire a splitting ratio in the polished faces to positionally align the polished faces at a position where the splitting ratio of a desired ratio is obtained, where the light intensity of the test light corresponds to a minimum light receiving sensitivity of the light receiving element.

7. The manufacturing apparatus of the optical splitter according to claim 6, wherein the bonding unit bonds the polished faces to each other in such a manner that a position of a center axis of the core of the coated optical fiber and a position of a center axis of the core of the planar lightwave circuit are spaced apart by a distance longer than or equal to a predetermined value.

8. The manufacturing apparatus of the optical splitter according to claim 6, wherein the adjustment unit moves the jig or the planar lightwave circuit to a position where, of light propagating through the core of the coated optical fiber, light that is evanescent-coupled to the core of the planar lightwave circuit and splits from the core of the planar lightwave circuit takes a desired value of light intensity, and then fixes the polished faces to each other.

9. The manufacturing apparatus of the optical splitter according to claim 6, wherein the adjustment unit inputs light with light intensity Pin to one port of the planar lightwave circuit, and from light intensity Pout of light that is output from the other port of the planar lightwave circuit and that is caused by the light with the light intensity Pin, the adjustment unit calculates a splitting ratio X of an optical splitter represented by an expression of X=1−Pout/Pin, and moves the jig or the planar lightwave circuit to a position at which the splitting ratio takes a desired value.

10. The manufacturing apparatus of the optical splitter according to claim 9, wherein the manufacturing apparatus moves the jig or the planar lightwave circuit in a direction horizontal relative to the polished face and perpendicular to the coated optical fiber, and in a case that the splitting ratio takes the desired value, the manufacturing apparatus terminates the movement and then fixes the jig or the planar lightwave circuit, and in a case that the splitting ratio does not reach the desired value, the manufacturing apparatus moves the jig or the planar lightwave circuit in a direction that is horizontal relative to the polished face and that is also a longitudinal direction of the coated optical fiber until the splitting ratio takes the desired value, and then fixes the jig or the planar lightwave circuit.

11. The manufacturing method of an optical splitter according to claim 1, wherein, in the third processing, the polished face of the planar lightwave circuit and the polished face of the coated optical fiber are arranged in a Y offset amount of 10 μm or more in a direction horizontal to the polished face and a direction perpendicular to the coated optical fiber, the polished face of the planar lightwave circuit and the polished face of the coated optical fiber are arranged in a Z offset amount greater than 1000 μm in a direction horizontal to the polished face and a longitudinal direction of the coated optical fiber, and the Y offset amount is adjusted to positionally align the polished faces.

12. The manufacturing apparatus of the optical splitter according to claim 1 wherein the planar light wave circuit serves as the core.

13. An optical splitter manufactured in accordance with the method of claim 1.

14. The manufacturing apparatus of the optical splitter according to claim 6, wherein the manufacturing apparatus moves the polished face of the planar lightwave circuit and the polished face of the coated optical fiber are arranged in a Y offset amount of 10 μm or more in a direction horizontal to the polished face and a direction perpendicular to the coated optical fiber, the polished face of the planar lightwave circuit and the polished face of the coated optical fiber are arranged in a Z offset amount greater than 1000 μm in a direction horizontal to the polished face and a longitudinal direction of the coated optical fiber, and the Y offset amount is adjusted to positionally align the polished faces.

* * * * *